Dec. 18, 1962  G. JONES  3,068,629
CYCLONE SEPARATORS IN TIERS
Filed Nov. 12, 1959  3 Sheets-Sheet 1

INVENTOR.
Gerwyn Jones
BY
ATTORNEY

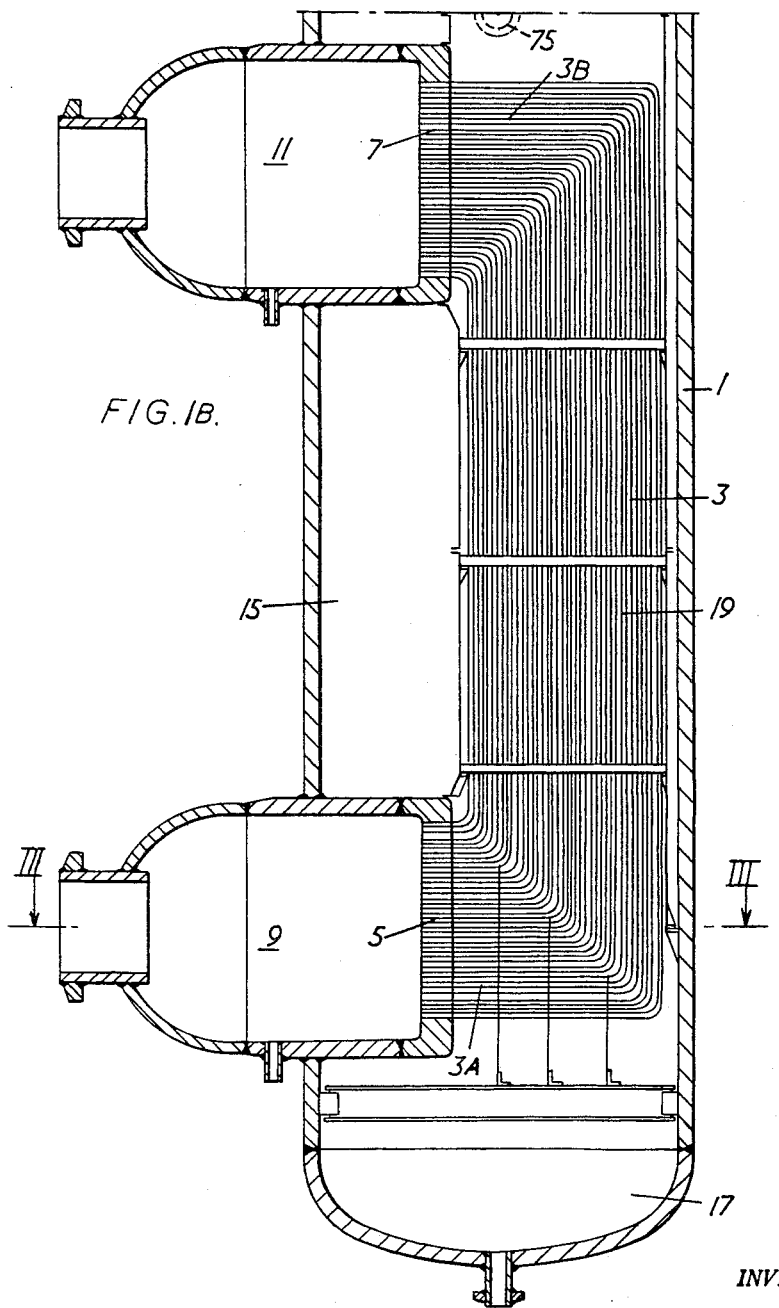

Dec. 18, 1962    G. JONES    3,068,629
CYCLONE SEPARATORS IN TIERS
Filed Nov. 12, 1959    3 Sheets-Sheet 3

INVENTOR.
Gerwyn Jones
BY
ATTORNEY

United States Patent Office 3,068,629
Patented Dec. 18, 1962

3,068,629
CYCLONE SEPARATORS IN TIERS
Gerwyn Jones, London, England, assignor to Babcock & Wilcox, Limited, London, England, a company of Great Britain
Filed Nov. 12, 1959, Ser. No. 852,559
Claims priority, application Great Britain Nov. 12, 1958
4 Claims. (Cl. 55—349)

This invention relates in general to vapor generators and particularly to a form of vapor generator having, within a chamber bounded by a pressure vessel wall with an upright axis and of circular cross-section, a vapor and liquid receiving space separated by baffle means from a vapor space above a normal liquid level in the chamber.

An object of the invention is the provision of effective vapor and liquid separating means capable of handling large flows of vapor and liquid having regard to the diameter of the pressure vessel wall.

According to the present invention, in a vapor generator having, within a chamber bounded by a pressure vessel wall with an upright axis and of circular cross-section, a vapor and liquid receiving space separated by baffle means from a vapor space above a normal liquid level in the chamber, centrifugal separators of the kind having a whirl chamber with an upright axis, an upper outlet for vapor and a lower annular, peripheral outlet for liquid are disposed in that chamber in a plurality of tiers each including a circular series of separators, the separators of the lowermost tier being arranged to discharge liquid below the normal liquid level and the separators of the upper tier arranged to discharge liquid into a trough at a level which is below a substantially constant liquid level in that trough and is above the normal liquid level in the chamber.

The various features of novelty which characterize the invention are pointed out with particularity in the claims annexed to and forming a part of this specification. For a better understanding of the invention, its operating advantages and specific object attained by its use, reference should be had to the accompanying drawings and descriptive matter in which I have illustrated and described a preferred form of the invention.

Figure 1A:
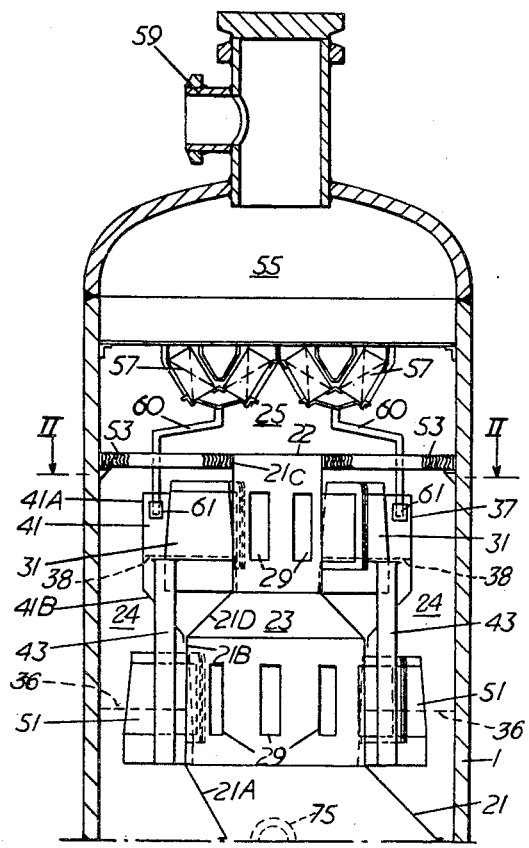
Figure 2:
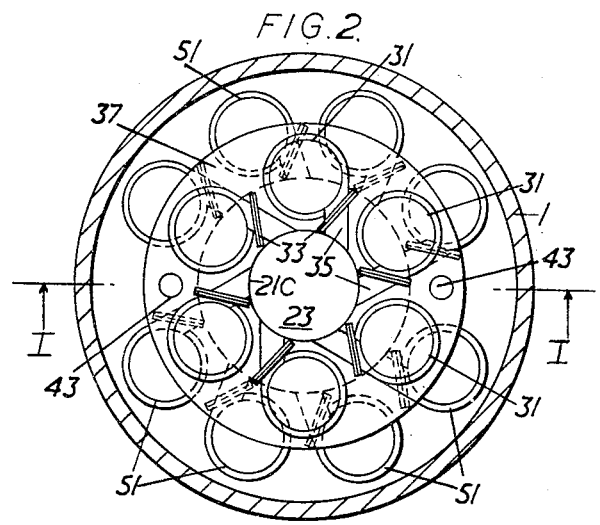
Figure 3:
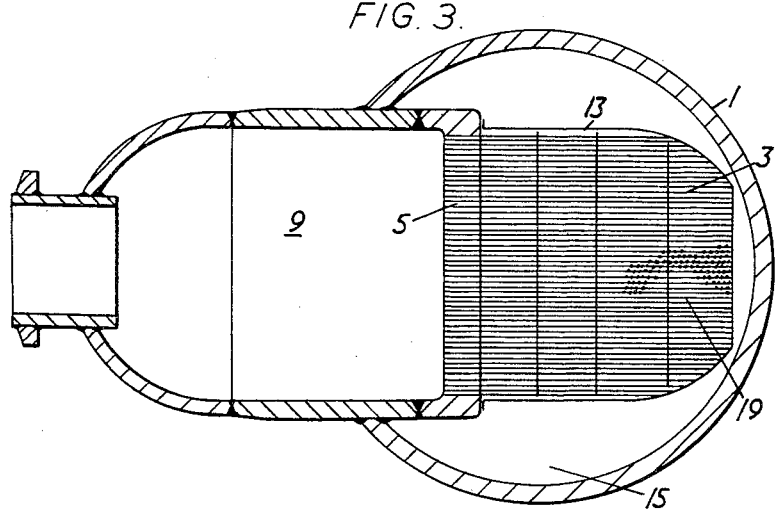

Of the drawings:
FIGURES 1A and 1B are sectional side elevations of upper and lower parts respectively of a steam generator, taken on the line I—I of FIGURE 2 and as viewed in the direction of the arrows;
FIGURE 2 is a sectional plan view taken on the line II—II of FIGURE 1A; and
FIGURE 3 is a sectional plan view taken on the line III—III of FIGURE 1B.

The steam generator includes a cylindrical pressure vessel 1 having an internal diameter of, for instance, six (6) feet arranged with its axis vertical and having its upper and lower ends closed by dished end parts welded to the cylindrical part of the vessel. Disposed within a lower part of the pressure vessel is a bank 3 of upright tubes the ends of which are shaped to extend laterally, as indicated at 3A and 3B, to two tube plates 5 and 7, respectively, at the inner ends of an inlet chamber 9 and an outlet chamber 11 which extend laterally through the pressure vessel wall. The tube bank 3 is enclosed by a sheet metal jacket 13 which defines, between itself and the pressure vessel wall, an annular down-flow space 15 communicating at its lower end with a space 17 below the inlet chamber 9. At its lower end the jacket 13 terminates on the center line of the tube plate 5 so that the space 17 is in communication with a heat exchange chamber 19 enclosed by the jacket 13, open at its bottom end, and containing the tubes of the tube bank.

The upper end of the jacket 13 is connected to a sheet metal casing 21 including a lower, crank section 21A, connecting the upper end of jacket 13, which is off-set from the longitudinal axis of pressure vessel 1, to a casing part co-axial with the vessel and comprising a lower cylindrical section 21B, an intermediate frusto-conical casing section 21D and a top cylindrical casing section 21C of lesser diameter than the casing section 21B and closed at its upper end by a wall 22. Casing 21 defines a vapor and liquid receiving space 23 separated by the casing from a surrounding annular liquid space and a superjacent vapor space 25.

Two tiers of centrifugal separators are arranged to receive the vapor and liquid mixture from the space 23. These centrifugal separators are of a well known kind having a whirl chamber with an upright axis, a tangential inlet for the vapor and liquid mixture, an upper outlet for separated vapor and a lower annular, peripheral outlet for separated liquid. Each of the cylindrical parts of the vapor and liquid space 23 are provided with outlet ports 29 spaced about the periphery of the casing and severally communicating with the tangential liquid and vapor inlets of the separators. Thus, as may be seen from FIGURE 2, each centrifugal separator 31 in the upper tier is disposed close to the casing section 21C and is joined by a flanged connection 33 to an outlet duct 35 leading from one of the ports 29. Each duct is approximately parallel to a radius from the axis of the vapor and liquid receiving space intersecting the axis of the associated centrifugal separator. The flanged connection 33 is approximately normal to a plane containing the axis of the centrifugal separator and bisecting the flanged connection.

These centrifugal separators 31 of the upper tier are arranged to discharge separated liquid downwardly into a trough 37 which completely encircles the casing section 21C. The trough 37 extends upwardly to within a short distance of the tops of the centrifugal separators 31 and comprises an inner wall constituted by the frusto-conical part 21D of the casing 21 which connects the cylindrical parts 21B and 21C, and a lower portion of the cylindrical casing section 21C, and an outer wall 41 comprising an upper cylindrical part 41A and a lower inverted frusto-conical part 41B terminating at its lower edge at the bottom of the aforesaid frusto-conical casing section 21D. Two diametrically opposite drain tubes 43 extend through the lower part of the outer wall of the trough 37 from a suitable predetermined level 38 above the bottoms of the centrifugal separators 31 to a level below the normal liquid level 36 in the pressure vessel, which level is about midway between the top and bottom of the cylindrical casing section 21B.

The centrifugal separators 51 of the lower tier are severally connected to the vapor and liquid space 23 through the ports 29 in the casing section 21B, flanged connections similar to connections 33 being utilized. These separators 51 are disposed in two similar symmetrically arranged groups, the spacing between the adjacent end centrifugal separators of the two groups being slightly greater than the spacing between adjacent separators in each group to provide the space necessary for the accommodation of the drain tubes 43. The centrifugal separators 51 are arranged to discharge the separated liquid downwardly below the normal water level 36 and the separators are positioned close to the cylindrical casing section 21B.

The annular space between the top of the casing section 21C and the wall of the pressure vessel 1, is provided with scrubber means 53 in the form of corrugated strips closely arranged to define therebetween narrow sinuous passages for the upward flow of vapor discharged from the centrifugal separators 31 and 51. These scrubber means are located a short distance above the outlets for the discharge of vapor from the centrifugal separators 31 of the upper tier. Above the scrubber means 53 in the vapor space 25 are disposed further scrubber means 57 comprising corrugated plates closely arranged to define therebetween narrow sinuous passages for the upward flow of vapor from the space 25 to the vapor outlet space 55, provided with a steam outlet 59. Water separated in and draining from scrubber means 57 flows through drain pipes 60 into channels 61 disposed in troughs 37 and acting as water seals for the lower ends of these pipes.

Adjacent the upper end of the tube bank 3 a water inlet nozzle 75 is welded to the pressure vessel wall and is arranged to supply feed water to downflow space 15.

The vapor generator described above is, in use, connected to a source of hot gases or hot liquid. For example, it is used in combination with a nuclear reactor and means for circulating coolant fluid in a closed circuit through the core of a nuclear reactor and through the bank of heating tubes 3, the flow of hot coolant fluid being in an upward direction through tube bank 3. Thus the nuclear reactor can be a pressurized water reactor, the coolant being water under pressure.

During operation, when the heated coolant is circulated through the bank of tubes 3, the water within the pressure vessel 1 is heated and boils. By natural circulation the water within the heat exchange chamber 19 rises and the liquid and vapor mixture enters the vapor and liquid receiving space 23 whence it is discharged through the outlet ports 29 to the tangential inlets of the centrifugal separators 31 and 51. The separated vapor discharged upwardly by the centrifugal separators enters the annular vapor space 24 above the normal liquid level 36 within the pressure vessel and flows through the scrubber means 53 and 57 to the vapor outlet space 55 whence it flows to a steam turbine or other vapor utilizing means. The liquid separated by the centrifugal separators 51 of the lower tier is discharged directly by the separators below the normal liquid level 36 in the pressure vessel, while the liquid separated by the centrifugal separators 31 of the upper tier is discharged below the predetermined liquid level 38 in the trough 41. The centrifugal separators 31 of the upper tier are therefore able to operate in the normal manner despite the fact that their liquid outlets are above the normal liquid level 36 in the pressure vessel. The liquid collected in the trough 41 spills over through the drain tubes 43 so that the water level within the trough is maintained substantially constant at a suitable predetermined level 38. The liquid discharged by the centrifugal separators 31 and 51, which is substantially free from steam bubbles, together with feed liquid supplied to the pressure vessel through feedwater inlet 75, enters the annular downcomer space 15 and flows downwardly towards the liquid space 17, then flowing upwardly into the open lower end of the jacket 13.

It will be seen that heat transmitted through the jacket 13 of the heat exchange chamber 19 is absorbed by water flowing downwardly about that jacket. Furthermore, since the annular downflow space 15 and the bottom of the pressure vessel are filled with relatively cool water, the heat losses through the wall of pressure vessel 1 can be maintained relatively low.

The arrangement of the centrifugal separators 31 and 51 is compact and permits the installation of sufficient separators in a pressure vessel of restricted diameter. In this manner a steam generator is provided capable of high rates of evaporation and steam separation in a cylindrical pressure vessel of restricted diameter.

While in accordance with the provisions of the statutes, I have illustrated and described herein a specific form of the invention now known to me, those skilled in the art will understand the changes may be made in the form of the apparatus disclosed without departing from the spirit of the invention covered by my claims and that certain features of the invention may sometimes be used to advantage without a corresponding use of the other features.

I claim:

1. In a vertically arranged pressure vessel of circular cross section having casing means co-acting with the walls of said pressure vessel to form an interior chamber having a vapor-liquid receiving chamber therein and a separate space arranged to accommodate a normal liquid level separating an upper vapor space from a lower liquid space, and a vapor outlet from said vapor space, the invention comprising an upper and a lower tier of vapor-liquid outlets through said casing means from said vapor-liquid receiving chamber, an upper and a lower tier of upright whirl chamber type vapor-liquid separators with each separator arranged to receive a vapor-liquid mixture from a corresponding one of said outlets, a trough disposed in said separate space subjacent said upper tier of outlets and above said normal liquid level, each of said separators in said lower tier arranged to directly discharge its separated liquid below said normal liquid level, and means for draining the liquid from and for maintaining a predetermined liquid level in said trough above said normal liquid level, each of said separators in said upper tier arranged to directly discharge its separated liquid into said trough below said predetermined liquid level therein.

2. In a vertically arranged pressure vessel of circular cross section having casing means co-acting with the walls of said pressure vessel to form an interior chamber having a vapor-liquid receiving chamber therein and a separate annular shaped space arranged to accommodate a normal liquid level separating an upper vapor space from a lower liquid space, and a vapor outlet from said vapor space, the invention comprising an upper and a lower tier of vapor-liquid outlets through said casing means from said vapor-liquid receiving chamber, an upper and a lower tier of rings of upright whirl chamber type vapor-liquid separators with each separator arranged to receive a vapor-liquid mixture from a corresponding one of said outlets, an annular shaped trough disposed in said separate annular shaped space subjacent said upper tier of outlets and above said normal liquid level, each of said separators in said lower tier arranged to directly discharge its separated liquid below said normal liquid level, and means for draining the liquid from and for maintaining a predetermined liquid level in said annular shaped trough above said normal liquid level, each of said separators in said upper tier arranged to directly discharge its separated liquid into said annular shaped trough below said predetermined liquid level therein.

3. In a vertically arranged pressure vessel of circular cross section having casing means co-acting with the walls of said pressure vessel to form an interior chamber having a vapor-liquid receiving chamber therein and a separate annular shaped space arranged to accommodate a normal liquid level separating an upper vapor space from a lower liquid space, and a vapor outlet from said vapor space, the invention comprising an upper and a lower tier of vapor-liquid outlets through said casing means from said vapor-liquid receiving chamber, an upper and a lower tier of rings of upright whirl chamber type vapor-liquid separators with each separator arranged to receive a vapor-liquid mixture from a corresponding one of said outlets, an annular shaped trough disposed in said separate annular shaped space subjacent said upper tier of outlets and above said normal liquid level, each of said separators in said lower tier arranged to directly discharge its separated liquid below said normal liquid level, and means for draining the liquid from and for maintaining a predetermined liquid level in said annular shaped trough above said normal liquid level, each of said separators in said upper tier arranged to directly discharge its separated liquid into said annular shaped trough below said predetermined liquid level therein, said trough being common to a plurality of separators.

4. In a vertically arranged pressure vessel of circular cross section having casing means co-acting with the walls of said pressure vessel to form an interior chamber having a vapor-liquid receiving chamber therein and a separate annular shaped space arranged to accommodate a normal liquid level separating an upper vapor space from a lower liquid space, and a vapor outlet from said vapor space, the invention comprising an upper and a lower tier of vapor liquid outlets through said casing means from said vapor-liquid receiving chamber, an upper and a lower tier of rings of upright whirl chamber type vapor-liquid separators with each separator arranged to receive a vapor-liquid mixture from a corresponding one of said outlets, an annular shaped trough disposed in said separate annular shaped space subjacent said upper tier of outlets and above said normal liquid level, each of said separators in said lower tier arranged to directly discharge its separated liquid below said normal liquid level, and means for draining the liquid from and for maintaining a predetermined liquid level in said annular shaped trough above said normal liquid level, each of said separators in said upper tier arranged to directly discharge its separated liquid into said annular shaped trough below said predetermined liquid level therein, the lower end of said drain means disposed below said normal liquid level.

References Cited in the file of this patent

UNITED STATES PATENTS

| | | |
|---|---|---|
| 1,333,325 | McGee | Mar. 9, 1920 |
| 2,205,966 | Von Tongeren | June 25, 1940 |
| 2,666,499 | Lochel | Jan. 19, 1954 |
| 2,845,906 | Gram | Aug. 5, 1958 |
| 2,862,479 | Blaser et al. | Dec. 2, 1958 |
| 2,936,852 | Opderbecke | May 17, 1960 |

FOREIGN PATENTS

| | | |
|---|---|---|
| ST7188 | Germany | Mar. 24, 1956 |